United States Patent
Asai et al.

[11] Patent Number: 6,041,745
[45] Date of Patent: Mar. 28, 2000

[54] TWO-CYCLE ENGINE

[75] Inventors: Masahiro Asai; Masashi Amano; Hideki Noritake, all of Saitama, Japan

[73] Assignee: Honda Giken Kogyo Kabushiki Kaisha, Tokyo, Japan

[21] Appl. No.: 09/050,429

[22] Filed: Mar. 31, 1998

[30] Foreign Application Priority Data

Mar. 31, 1997 [JP] Japan .................................. 9-098415

[51] Int. Cl.[7] .................................................. F02B 33/04
[52] U.S. Cl. ..................................... 123/73 PP; 123/65 P
[58] Field of Search ............................. 123/73 PP, 65 P, 123/65 PD, 65 PE

[56] References Cited

U.S. PATENT DOCUMENTS

| | | |
|---|---|---|
| 2,114,582 | 4/1938 | Venediger . |
| 2,271,015 | 1/1942 | Jackson . |
| 4,638,770 | 1/1987 | Fox . |
| 4,886,021 | 12/1989 | Seeber et al. ...................... 123/73 PP |

FOREIGN PATENT DOCUMENTS

| | | |
|---|---|---|
| 96751 | 4/1973 | German Dem. Rep. . |
| 283626 | 1/1929 | Germany . |
| 19512566 | 10/1996 | Germany . |
| 56-56915 | 5/1981 | Japan . |
| 62-59194 | 3/1987 | Japan . |
| 3-74519 | 3/1991 | Japan . |
| 3-74520 | 3/1991 | Japan . |
| 5-246385 | 9/1993 | Japan . |
| 7-71279 | 3/1995 | Japan . |
| 7-97912 | 4/1995 | Japan . |
| 7-180556 | 7/1995 | Japan . |
| 864329 | 4/1961 | United Kingdom . |
| 2201463 | 2/1988 | United Kingdom . |
| 9010145 | 9/1990 | WIPO . |
| 9501504 | 1/1995 | WIPO . |

*Primary Examiner*—Noah P. Kamen
*Attorney, Agent, or Firm*—Birch, Stewart, Kolasch & Birch, LLP

[57] ABSTRACT

To provide a compact two-cylinder engine in which adjacent cylinders are located close to each other. In the two-cycle engine of the present invention, the scavenging passages of scavenging ports adjacent to the exhaust ports are flat or elongate in their cross section and extend to the sides of the exhaust ports. This structure allows the cross-sectional area of the scavenging passages to be sufficient, but allows the width of the cylinder section between adjacent cylinders to be decreased. Furthermore, in the two-cycle engine of the present invention, the exhaust passages of the cylinders are arranged in the direction substantially orthogonal with the direction of alignment of the cylinders, and the exhaust control valves are positioned near the exhaust ports in order to control an opening amount of the exhaust ports. The exhaust control valves are rotatably supported by a pivot extending substantially in parallel with the juxtaposed direction of the cylinders, and are turned in a plane which is parallel with the opening direction of the exhaust ports.

20 Claims, 7 Drawing Sheets

TWO-CYCLE ENGINE

BACKGROUND OF THE INVENTION

1. Field of the Invention

The present invention relates to the structure of scavenging passages in a two-cycle engine. More particularly, the present invention relates to a two-cycle engine in which the cylinder section is narrowed.

2. Description of Background Art

The two-cycle engine is a known as an engine which is compact but can produce a high output because of its relatively simple structure and mechanism. The two-cycle engine has been widely applied to motorcycles, small boats, etc. In the known two-cycle engine, the valves are disposed near the exhaust ports, which are opened or closed in order to control exhaust gases. Therefore, the engine is allowed to operate under optimum conditions.

For example, the two-cycle engine disclosed in Japanese Patent Laid-Open Publication No. Hei 7-71279 or No. Hei 7-180556 includes exhaust control valves disposed on the inner walls of the exhaust passages near the upper edges of the exhaust ports for opening or closing the exhaust ports. When the engine is operating at a low speed or under a low load, the exhaust control valves substantially fully close the exhaust ports. This causes the pressure in the cylinders to be optimally cotrolled, fresh air in the combustion chambers to be activated using thermal energy of already burnt gasses remaining therein, combustion in an active and hot atmosphere in which self-ignition combustion is carried out to be realized, and fuel economy to be improved and purification of exhaust gases to be promoted.

Furthermore, Japanese Patent Laid-Open Publication No. Sho 56-56915 exemplifies a two-cycle engine in which the exhaust control valves for varying exhaust emission timing are positioned on the inner walls of the exhaust passages near upper edges of the exhaust ports. When the engine is operating at a high speed, the exhaust control valves are fully opened to advance the timing for opening the exhaust ports (i.e., exhaust emission timing), thereby promoting discharge of exhaust gases. Conversely, when the engine is operating at a low speed, the exhaust control valves are nearly closed to retard the exhaust emission timing and prevent fresh air from blowing through the cylinders.

In the known two-cycle engine, the scavenging passages are usually formed on a side of the cylinder block. When a plurality of cylinders are juxtaposed, spaces between the cylinders (i.e., the width of a cylinder section) inconveniently become too large. Furthermore, when the exhaust control valves are provided, it is required to simplify the mechanism for activating the exhaust control valves, to improve assembling efficiency, and facilitate maintenance of the engine.

In order to meet the foregoing requirements, two-cycle engines including exhaust control valves for varying the exhaust emission timing have been proposed in Japanese Patent Laid-Open Publications No. Hei 3-74519, No. Hei 3-74520, and No. Hei 7-97912.

In one of such proposals shown in FIG. 7, exhaust passages 101 are inclined in the same direction with respect to a plane which is orthogonal to the center axis 100 of the cylinders (i.e., the axis along which the cylinders are juxtaposed). Furthermore, a pivot 103 rotated by a servomotor 102 is arranged in parallel with the cylinder center axis 100. Exhaust control valves 105 positioned at upper edges of the exhaust ports 104 are supported in common by the pivot 103, thereby simplifying the mechanism for activating the exhaust control valves. In addition, scavenging passages 107 are formed in the cylinder block 106 in order to supply fresh air (an air-fuel mixture) to the combustion chambers from the crankcase. The scavenging passages are inclined in the same direction with respect to the plane which is orthogonal to the cylinder center axis 100. Therefore, the exhaust passages which are sandwiched between the exhaust ports are arranged in a staggered manner in order to reduce the width of the cylinder section.

In the example shown in FIG. 7, the pivot 103 is inclined with respect to an opening direction of the exhaust ports 104, so that the rotating exhaust control valves 105 cannot reliably close the exhaust ports 104. This prevents the exhaust emission timing from being precisely controlled. In the example, the shape of the exhaust control valves 105 are constructed to overcome the foregoing problem. However, this construction is not advantageous since the exhaust control valves become too large and the spaces for housing them become complicated. This results in an increase in manufacturing cost, and reduced efficiency in assembling and maintaining the engine.

Since the pivot is inclined with respect to the opening direction of the exhaust ports 104, the pivot 103 inevitably is very large. Furthermore, the exhaust control valves are longer between their bases and tips. Such lengthened members have reduced rigidity. Therefore, it is difficult to precisely control them.

The foregoing holds true for exhaust control valves which enable combustion under an active and hot atmosphere.

SUMMARY OF THE INVENTION

The present invention was conceived in order to overcome the foregoing problems of the related art. The present invention is intended to provide a compact two-cycle engine in which a cylinder section is narrowed by modifying the position and cross sectional shape of the scavenging passages.

Furthermore, the present invention is intended to provide a two-cycle engine including exhaust control valves for juxtaposed cylinders. In the two-cycle engine, the exhaust control valves and an exhaust control valve activating mechanism are simplified in structure and shape to improve the efficiency of assembling and maintaining the engine and to promote exhaust gas purification.

According to the invention, there is provided a two-cycle engine in which the exhaust ports and scavenging ports are formed on inner walls of the cylinders. The scavenging ports communicate with the crankcase via the scavenging passages. Furthermore, the exhaust ports communicate with the exhaust pipe via the exhaust passages. The scavenging passages of the scavenging ports adjacent to the exhaust ports have a flat or elongated cross-sectional shape and extend to sides of the exhaust ports.

Although the scavenging passages are narrow in a width direction of the cylinder section, the necessary cross sectional area of the scavenging passages is maintained, and the size of the cylinder section is reduced.

In a preferred embodiment of the two-cycle engine according to the present invention, a plurality of cylinders are arranged in parallel, the exhaust passages of the cylinders are arranged in a direction substantially orthogonal to the parallel direction of the cylinders, and the exhaust control valves are disposed near the exhaust ports of the respective cylinders in order to control open areas of the exhaust ports. Furthermore, the exhaust valves are supported by a pivot extending substantially in parallel to the direction of the cylinders such that the exhaust control valves are capable of swinging.

The present invention reduces the size of the two-cycle engine. Furthermore, a plane including a turning orbit of the exhaust control valves is substantially in parallel with the opening direction of the exhaust ports, which can simplify the exhaust control valves and spaces for housing these valves, reduce the manufacturing cost of the engine, and improve the efficiency of assembling and maintaining the engine. Still further, the pivot extends in a direction which is substantially orthogonal to the opening direction of the exhaust ports. This arrangement is effective in reducing the length of the pivot and the size of the exhaust control valves. This makes these members more rigid and improves control of exhaust emission.

The present invention is also applicable to two-cycle engines without exhaust control valves, regardless of the number of cylinders, e.g., single or multiple cylinders. Therefore, a two-cycle engine having a narrow cylinder section can be realized.

Furthermore, the invention is applicable not only to two-cycle engines including exhaust control valves for varying exhaust emission timing but also to two-cycle engines including exhaust control valves for performing combustion under the active and hot atmosphere. In addition, the invention is applicable to two-cycle engines including exhaust control valves for varying open areas of exhaust ports in accordance with the temperature of exhaust gases (e.g., the two-cylinder engine disclosed in Japanese Patent Laid-Open Publication No. Hei 7-97912).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A two-cycle engine according to the present invention will be described with reference to the embodiment shown in the accompanying drawings.

In this embodiment, the present invention is applied to a two-cycle, three-cylinder engine for a jet-propelled boat on which a rider sits astride, as disclosed in Japanese Patent Laid Open Publication No. Sho 62-59194 or No. Hei 5-246385.

Figure 2:
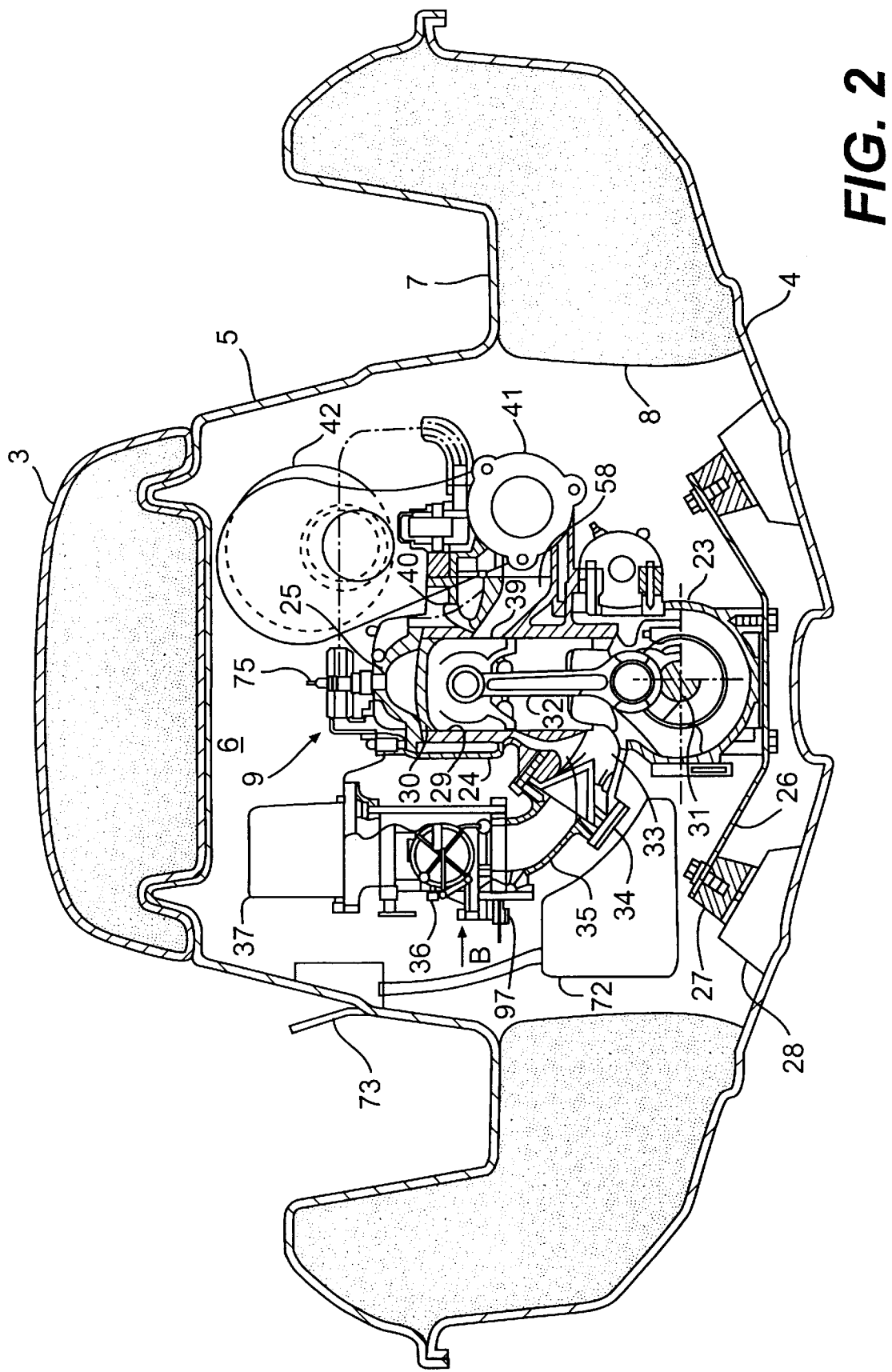
FIG. 2 is a cross sectional view observed in the direction of arrow II—II in FIG. 1.

As illustrated in the figures, the jet-propelled boat 1 includes a steering handle 2 substantially at its center and a seat 3 in the shape of a saddle which is behind the steering handle 2. The rider sits astride the seat 3 (with his or her feet kept on footrests 7 as shown in FIG. 2), and operates the steering handle 2 in order to propel the boat 1.

The boat 1 includes a lower panel 4 and an upper panel 5 which are made of reinforced plastic (FRP) or the like, which and are joined from both upper and lower sides. A vacant space 6 is defined by the upper and lower panels, so that the boat 1 has a buoyant structure. The footrests 7 are positioned at opposite sides of the seat 3 on the upper panel 5. A part of the space 6 under the footrests 7 houses a buoyant float 8.

A power unit mainly constituted by an engine 9 is housed in the space 6 in the boat 1. The space 6 is defined under the seat 3, and is relatively narrow in view of the center of gravity for assuring good steering feeling and a positional relationship with a jet propeller 10 which is at a rear end of the boat 1.

Figure 1:
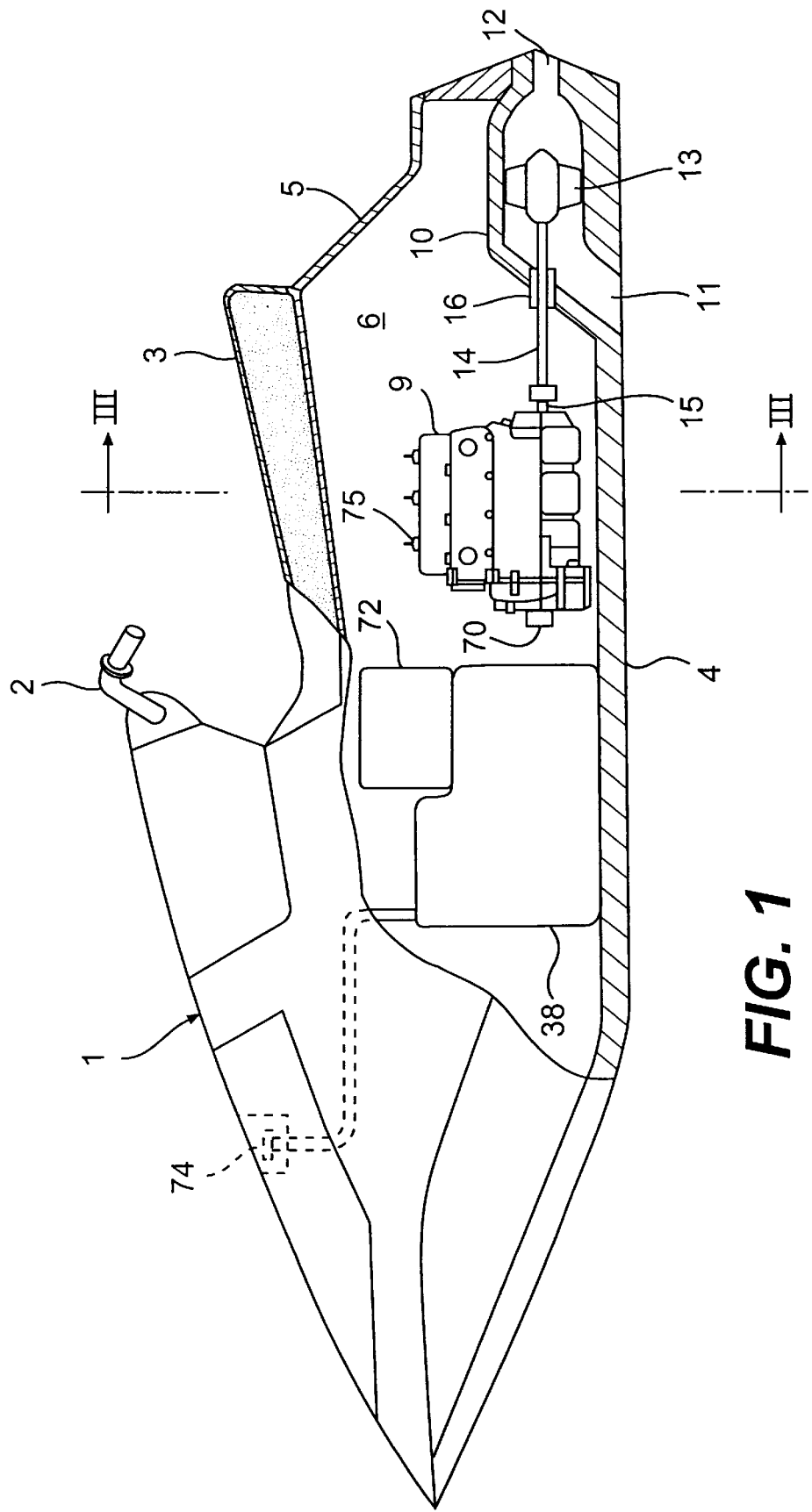
FIG. 1 is a side view, and partly cross sectional view, of the jet-propelled boat to which an embodiment of the present invention is applied.

The jet propeller 10 forms a channel from a water inlet 11 on the bilge of the boat to a jet nozzle 12 which opens at the rear end of the boat, and houses an impeller 13 which is rotatable in the channel. The impeller 13 is connected to an output shaft 15 of the engine 9 via a drive shaft 14. In FIG. 1, reference numeral 16 denotes a sealing member for maintaining the drive shaft 14 water-tight.

When the engine 9 rotates the impeller 13, water introduced via the water inlet 11 is ejected, with a gush, via the jet nozzle 12, thereby propelling the boat 1 forward.

The engine 9 is a two-cycle, three-cylinder engine in which three cylinders are juxtaposed with respect to the crankshaft. The engine 9 is housed in the space 6 which is substantially in the shape of an inverted cone and is present under the seat 3, with the crankshaft extending forward and backward along the length of the boat 1, and axes of the cylinders oriented toward the apex of the bilge in the shape of the inverted cone.

The engine 9 is mounted in the boat 1 in the following manner. A cylinder block 24 and a cylinder head 25 are stacked on a crankcase 23 one on top of the other so as to form one integral unit. The crankcase 23 is attached to an engine hanger 26, which is engaged via a mounting block 27 with bosses 28 formed on the lower panel 4.

Figure 3:
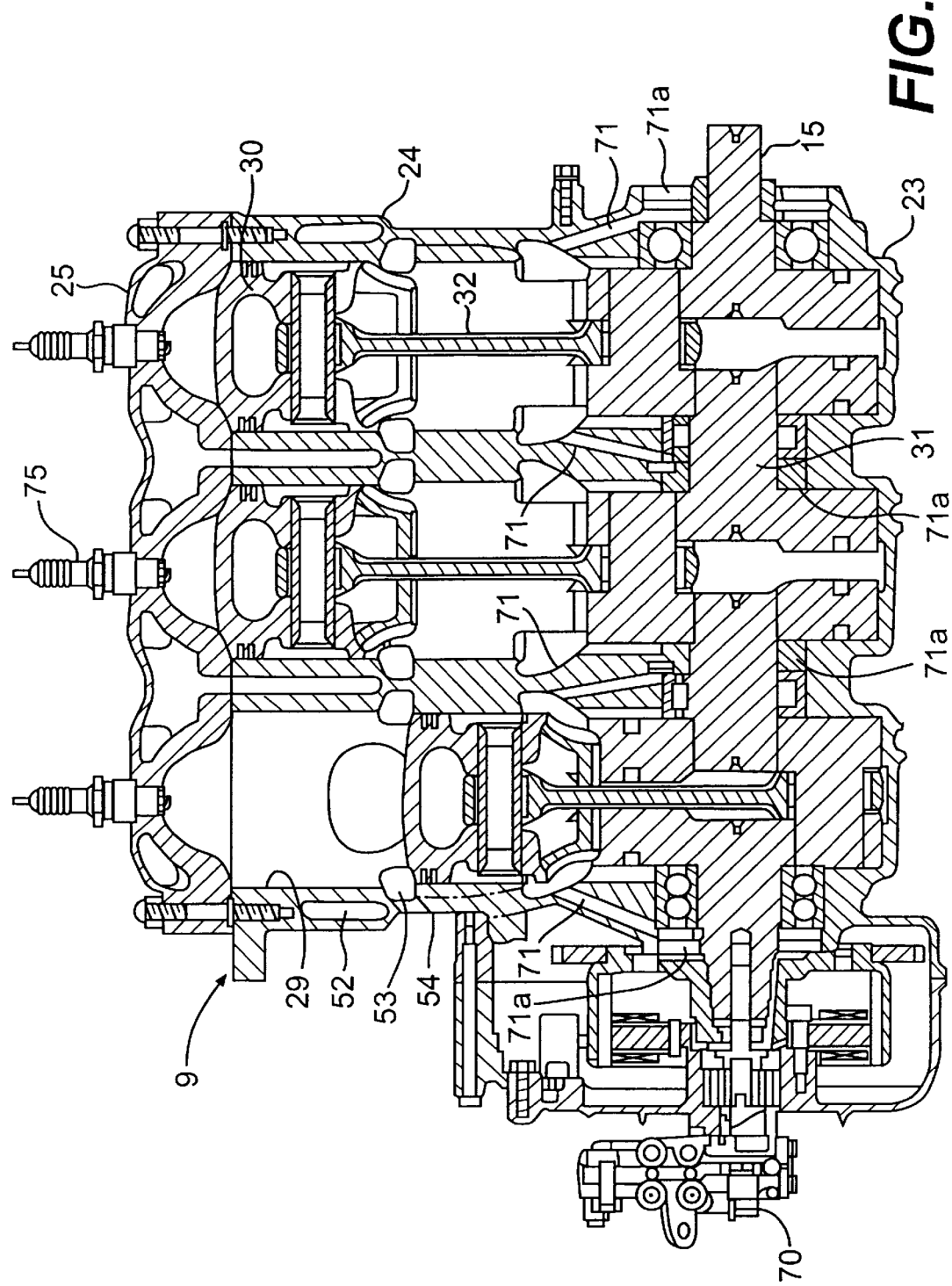
FIG. 3 is a longitudinal cross sectional view of the two-cycle engine of the present invention.
Figure 4:
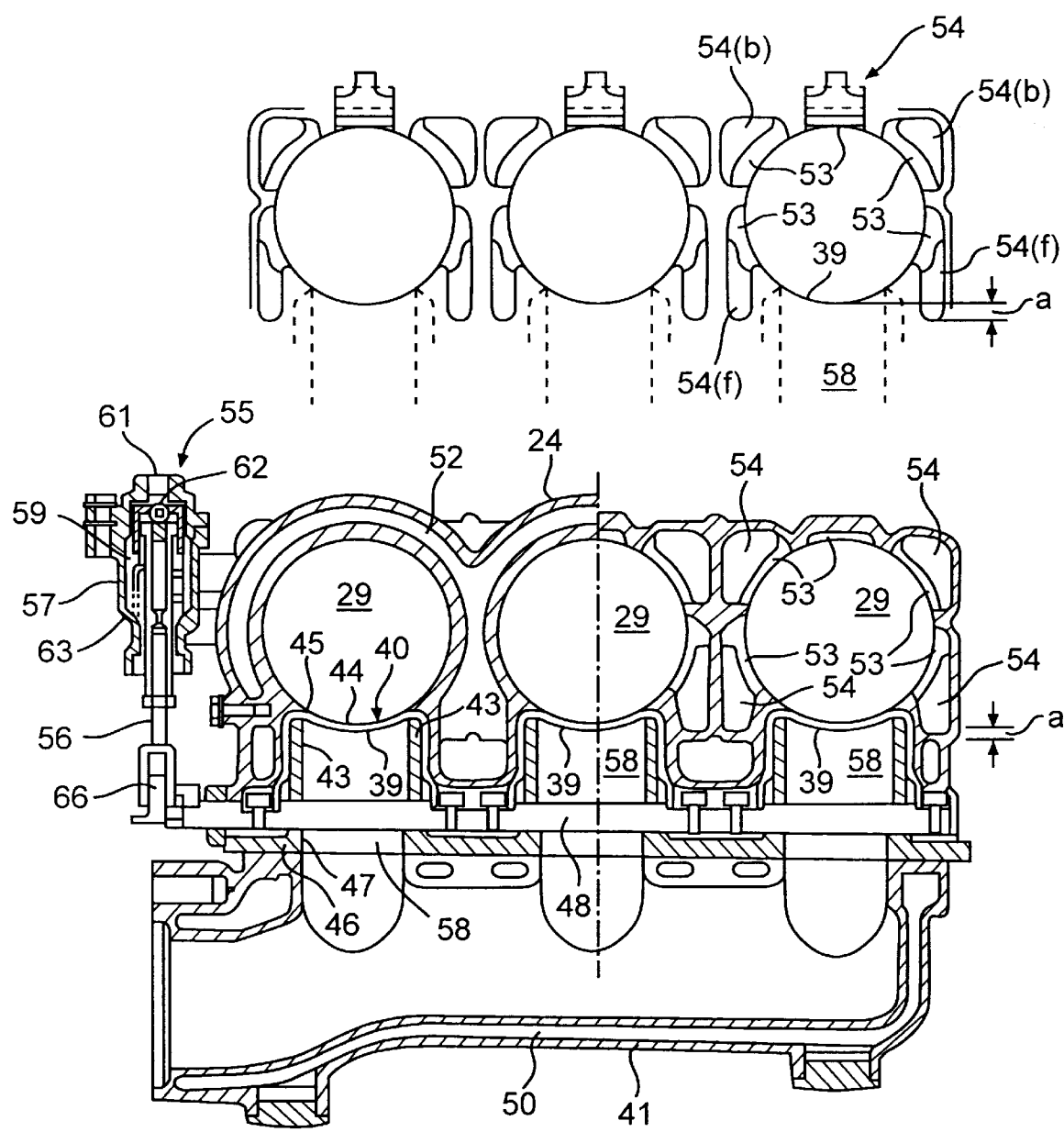
FIG. 4 is a lateral cross section and a plan view of the two-cycle engine, showing the scavenging passages.

Referring to FIGS. 3 and 4, pistons 30 are slidably fitted in three cylinder holes 29 on the cylinder block 24. Each piston 30 is coupled to a crankshaft 31 via a connecting rod 32. The crankshaft 31 is rotated in response to the upward and downward movements of the pistons 30, so that the rotating force of the crankshaft 31 is transmitted via the output shaft 15 in order to rotate the impeller 13.

Intake ports 33 are formed on one side of the cylinder block 24 (i.e., on the left side in FIG. 2) for each of the respective cylinders. The intake ports 33 include reed valves 34 therein, and are connected to carburetors 36 via an intake manifold 35. An air cleaner 37 is positioned upstream of the carburetors 36. Fuel is supplied to the carburetors 36 from a fuel tank 38.

The operation of a throttle lever (not shown) connected to the steering handle 2 controls an opening amount of the throttle valves of the carburetors 36, and allows the air from the air cleaner 37 to be mixed with the fuel in the carburetors 36. An air-fuel mixture is then supplied to the crankcase 23 via the reed valves 34 and the intake manifold 35.

Exhaust ports 39 are disposed on the other side of the cylinder block 24 (i.e., on the right side in FIG. 2) for each of the respective cylinders. Exhaust control valves 40 are provided in the exhaust ports 39. The exhaust control valves 40 are positioned near the exhaust ports confronting the cylinder holes 29, are capable of swinging, and are activated by a cylinder device in accordance with the speed of the jet boat as will be described later. Each exhaust valve 40 controls an open area of each exhaust port 39 to enable the exhaust port 39 to discharge exhaust gases most efficiently in accordance with the operation of the engine. Specifically, the exhaust ports 39 are closed in order to promote combustion under the active and hot atmosphere when the jet boat is running at a low speed or under a low load, thereby improving fuel economy and promoting exhaust gas purification.

The exhaust ports 39 are connected to an exhaust manifold (exhaust pipe) 41, and are collectively connected to an exhaust chamber 42 via an exhaust manifold 41. The exhaust chamber 42 is connected to a silencer (not shown) at the rear end of the boat. Exhaust gases from the exhaust ports 39 are discharged out of the boat 1 via the exhaust manifold 41, exhaust chamber 42, and silencer.

In the embodiment of the present invention, the exhaust manifold 41 opens toward the bow (to the left in FIG. 1) of the boat 1, and the exhaust chamber 42 is connected to an open end of the exhaust manifold 41. The exhaust chamber 42 is folded upward, and then extends rearward to come into contact with the silencer.

Referring to FIG. 4, each exhaust control valve 40 includes a pair of plates 43 substantially in the shape of a sector and a valve plate 44 whose cross section is in the shape of an arc. Each plate 43 is coupled to the valve plate 44 at its edges. Each exhaust control valve 40 is housed in a cavity 45 which is positioned along the upper edges of the exhaust ports on the cylinder block 24. The exhaust control valve is in the shape of an arc in longitudinal cross section. A bracket 46 for supporting the exhaust control valves 40 is interposed and fixed between the cylinder block 24 and the exhaust manifold 41. The bracket 46 has through-holes 47 for enabling the exhaust passages 58 to communicate with the exhaust manifold 41. Furthermore, the bracket 46 rotatably supports the pivot 48 extending between the cylinders. Bases of the plates 41 of the exhaust control valves 40 are fixed to the pivot 48 using small screws.

The axial rotation of the pivot 48 supporting the exhaust control valves 40 enables opening and closing of the exhaust control valves 40, so that an opening ratio of the exhaust ports 39 is variable between substantially fully closed and substantially fully open.

In this embodiment, the exhaust passages 58 extend across the juxtaposed direction of the cylinders, and the exhaust control valves 40 are arranged in the same direction as the juxtaposed direction of the cylinders. The exhaust control valves 40 are supported by the pivot 48, and are capable of swinging thereon.

Figure 7:
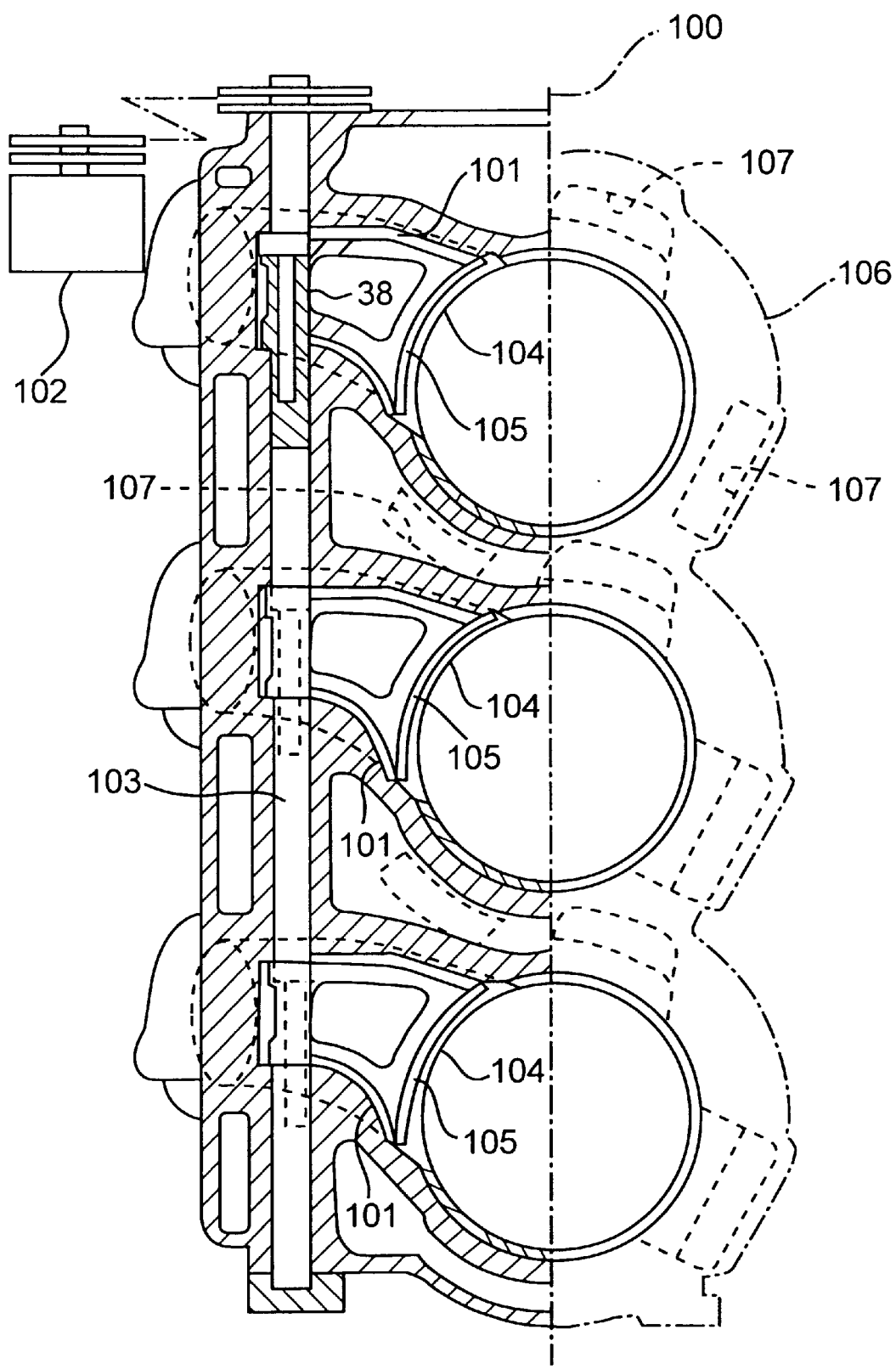
FIG. 7 is a lateral cross sectional view of a two-cycle engine of the related art.

The plane containing the swinging orbit of the exhaust control valves 40 is parallel to the direction in which the exhaust ports 39 open, which is effective in reliably controlling the opening and closing of the exhaust ports 39, compared with the two-cycle engine of the related art in which the exhaust control valves and the space for housing them have complicated shapes (see FIG. 7). As will be described later, the scavenging passages 54 are relatively flat in order to narrow the spaces between the cylinders. The pivot 48 extends in the direction orthogonal to the opening direction of the exhaust ports 39. Therefore, it is possible to shorten the pivot 48 and reduce the size of the exhaust control valves 40, compared with those in the related art. Furthermore, these members become more rigid, so that the exhaust control valves 40 can be controlled more reliably with respect to their turning position (i.e., the opening ratio of the exhaust ports can be controlled more reliably).

Referring to FIG. 2, the exhaust passages 58 extending from the exhaust ports 39 are folded downward toward the exhaust manifold 41 in order to detour the upper edges of the exhaust ports 39. This enables the pivot 48 to be arranged across the exhaust passages 58, and to support all the exhaust control valves 40. Thus, it is possible to simplify the structure for supporting the exhaust control valves 40, and facilitate assembly of the engine 9.

As shown in FIG. 4, the exhaust manifold 41 is provided with a water jacket 50 through which cooling water flows. Furthermore, the cylinder block 24 includes a water jacket 52 communicating with the water jacket 50 via a pipe (not shown) in order to introduce the cooling water.

Five scavenging ports 53 are formed above the cylinder holes 29, with each scavenging ports 53 communicating with the interior of the crankcase 23 via the scavenging passages 54 longitudinally passing through the cylinder block 24.

The two-cycle engine performs the scavenging operation in the following manner. The air-fuel mixture supplied to the crankcase 23 is compressed by the downward movement of the pistons 30, and is supplied under pressure to the combustion chambers of the cylinders via the scavenging passages 54 and the scavenging ports 53.

The scavenging passages 54 have a flat or elongate cross sectional shape along an entire length thereof from the crankcase to the scavenging ports in order to narrow the spaces between the cylinders 29. Referring to FIG. 4, a portion of the elongate cross-section of the scavenging passages is located between adjacent cylinders.

As shown at the upper part of FIG. 4, each scavenging passage 54(b) far from the cylinder can be made to bulge out at a position remote from the space between the adjacent cylinders (i.e., toward the rear side of the cylinders) in order to maintain a required cross sectional area. However, each scavenging passage 54(f) cannot be made to bulge out on the front side of the cylinders because of the presence of the exhaust passages 58. In order to overcome this problem, the scavenging passages 54(f) which are adjacent to the exhaust ports 39 are made relatively flat or elongated and extend toward the sides of the exhaust ports 39, thereby maintaining the required cross sectional areas thereof and narrowing the spaces between the cylinders.

Referring to FIG. 4, the cylinder device 55 is attached to an outer side wall of the cylinder block 24, and has a tip of its piston rod 56 coupled to the pivot 48 for the exhaust control valves.

The cylinder device 55 includes a piston 59 housed in a cylinder body 57 via a diaphragm so as to swing freely. The piston rod 56 projecting from the cylinder body 57 is attached to the piston 59.

The cylinder body 57 is provided with an intake port 61 for supplying liquid to a pressure chamber which a pressure receiving area of the piston 59 confronts, a discharge port 62 for discharging the liquid from the pressure chamber, and a return spring 63 for urging the piston 69 against water pressure from the pressure chamber. Therefore, when the water pressure above a predetermined value is applied to the pressure chamber, the piston 59 moves against the return spring 63 to project the piston rod 56. Conversely when the water pressure is reduced below the predetermined value, the piston 59 retracts the piston rod 56 in response to the resilience of the return spring 63.

The piston rod 56 is coupled at its tip to a lever 66 attached to one end of the pivot 48, so that the lever 66 as well as the pivot 48 is rotated in response to the movement of the piston rod 56. In other words, if the water pressure exceeding the predetermined value is applied to the pressure chamber and the piston rod 56 projects, the lever 66 is rotated to enable the exhaust control valves 40 to fully open the exhaust ports 39. Conversely. if the water pressure is reduced below the predetermined value and the piston rod 56 is retracted, the lever 66 is rotated in the opposite direction, and the exhaust control valves 40 close the exhaust ports 39 substantially fully.

In the present embodiment, water pressurized by the jet propeller 10 is supplied to the pressure chamber of the cylinder device 55. The faster the impeller 13 is rotated, the higher the pressure of the water is raised, so that the exhaust control valves 40 are operated to open the exhaust ports 39 fully (i. e., 100%). Conversely, if the impeller 13 is rotated at a moderate speed (i.e., when the engine is operating at a low speed or under a low load), the pressure of the water applied to the pressure chamber is relatively low. In this state, the return spring 63 urges the exhaust control valves 40 to close, thereby substantially closing the exhaust ports 39, and allowing the engine to perform combustion under the active and hot atmosphere.

As shown in FIG. 3 in detail, the two-cycle engine 9 adopts a separate oil supply system. An oil pump 70 is connected to one end of the crankshaft 31 of the engine 9. When activated in response to the rotation of the crankshaft 31, the oil pump 70 supplies pressurized lubricating oil from a lubricating oil tank 72 to respective parts of the engine 9 via oil paths 71 or the like formed in the cylinder block 24. The oil paths 71 communicate with the bearings of the crankshaft 31 which are positioned inside the oil sealing members 71a. When returning via the scavenging passages 54, some of the lubricating oil enters into the oil paths 71 to lubricate the bearings of the crankshaft.

In FIG. 2, reference numeral 73 denotes an oil lid for supplying the lubricating oil to the lubricating oil tank 72. Reference numeral 74 in FIG. 1 denotes a fuel lid for supplying the fuel to the fuel tank 38. In FIGS. 1 and 3, reference numeral 75 denotes spark plugs provided for the respective cylinders, and used to ignite the compressed gas in the combustion chambers.

Figure 5:
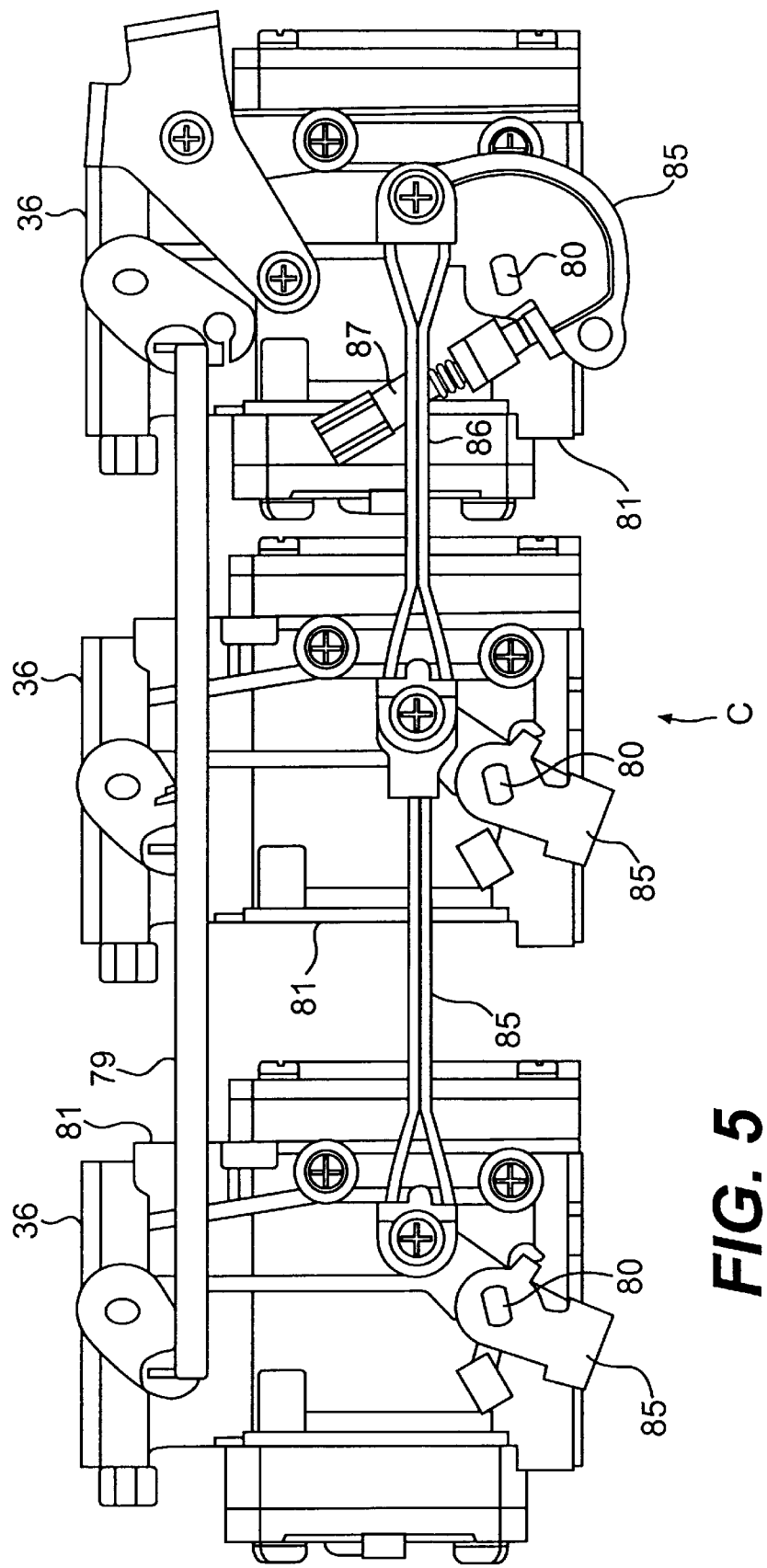
FIG. 5 is a side view of carburetors according to the present invention, observed in the direction of arrow B in FIG. 2.
Figure 6:
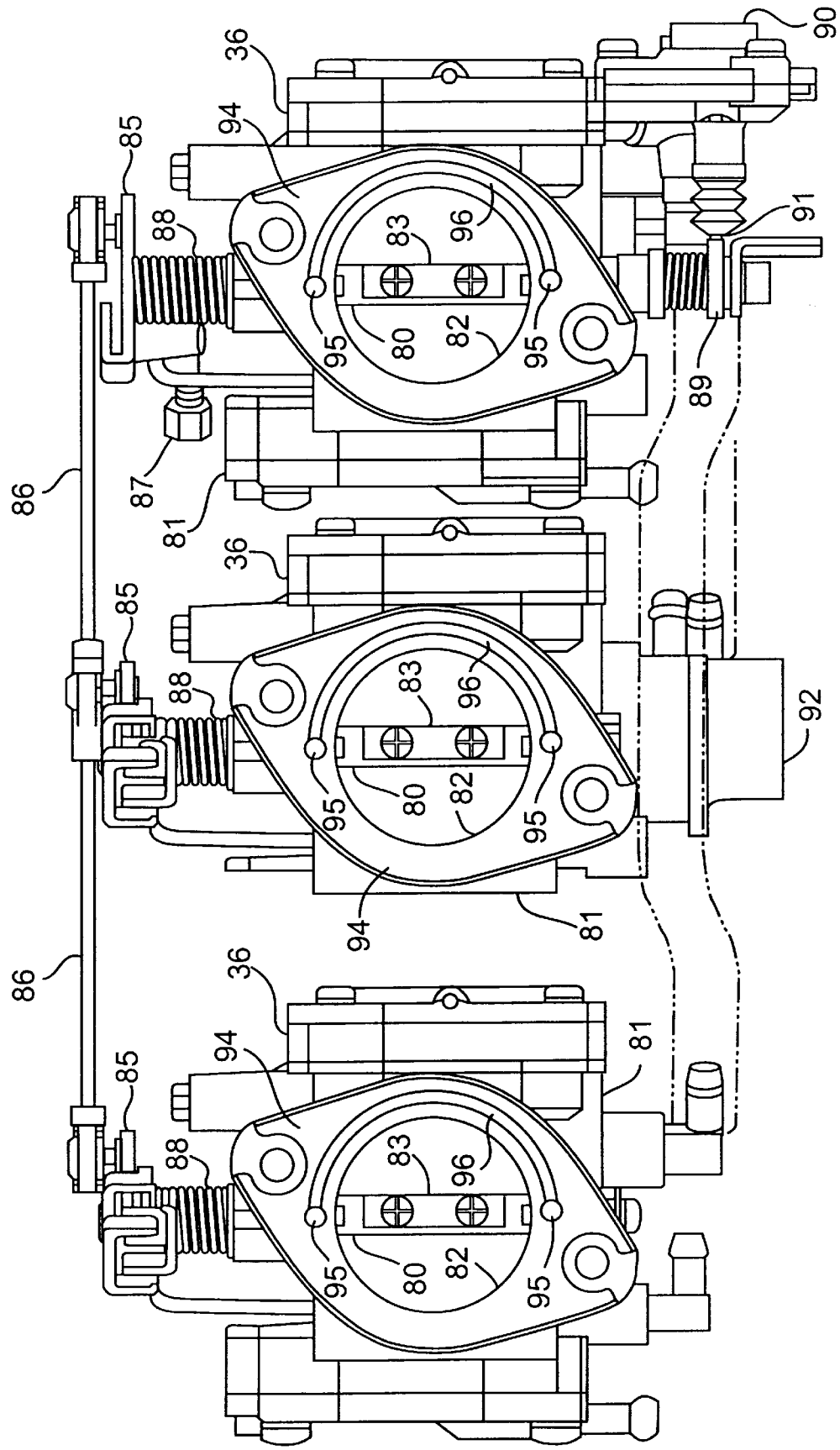
FIG. 6 is a bottom view of the carburetors observed in the direction of arrow C in FIG. 5.

A total of three carburetors 36 are provided for the three cylinders, and are arranged- in parallel with one another similarly to the cylinders. Referring to FIG. 5 showing the structure viewed in the direction of arrow B in FIG. 2, and FIG. 6 showing the structure viewed in the direction of arrow C in FIG. 5, each carburetor 36 is arranged with its throttle shaft 80 extending in a direction orthogonal to the juxtaposed direction of the cylinders. The throttle shafts 80 are independent from one another and arranged in parallel. The carburetors 36 are spaced relatively close to one another, and are joined by a stay 79, thereby forming an integral carburetor unit.

Each throttle shaft 80 is rotatably supported by a carburetor body 81 with one end extending outwardly therefrom.

A throttle valve 83 for adjusting a throttle opening amount is disposed at a position in each barrel 82 of each carburetor 36. Furthermore, a venturi for injecting and spraying the fuel is provided in the barrel 82.

Each throttle shaft 80 is provided with a lever 85 at its other end. Adjacent levers 85 are mutually coupled by links 86. A throttle wire (not shown) is connected to one of the levers 85 via an adjusting bolt 87 for adjusting the tension of the throttle wire. When the throttle wire is pulled in response to the throttle operation at the steering handle, the throttle shafts 80 are synchronously moved and shifted via the levers 85 and the links 86.

A return spring 88 is wound around each throttle shaft 80. When no tension is applied from the throttle wire during idling, for example, the return springs 88 urge the throttle shafts 80 to return to a moving position where the throttle opening amount is minimum.

One of the throttle shafts 80 has a cam 89 attached therewith at the end opposite to the end coupled to the link 86. An accelerating pump 90 attached to the carburetor body 81 is positioned near the cam 89. A piston rod 91 of the accelerating pump 90 has its one end in contact with the cams 89. When the cams 89 are moved together with the throttle shaft 80, the piston rod 91 is pushed backwards to activate the accelerating pump. A predetermined amount of fuel is stored in the accelerating pump 90. Therefore, when the throttle valves are opened in order to start the engine or to suddenly accelerate the jet boat, the accelerating pump 90 also supplies the fuel to the venturis, thereby optimizing the concentration of the air-fuel mixture generated by the carburetors 36.

One of the remaining throttle shafts 80 has a throttle sensor 92 attached to its end opposite to the end coupled to the link 86. The throttle sensor 92 detects the movement of the throttle shafts 80 (i.e., the throttle opening amount) in order to control the operation of the engine.

In the present embodiment, the carburetors 36 are arranged such that the throttle shafts 80 are independent from one another without the use of any coupling member therebetween. Therefore, the carburetors 36 are positioned relatively close to one another, compared with the prior art in which carburetors are arranged with throttle shafts being in line with one another and coupled by coupling members. Furthermore, even when the scavenging passages 54 are made relatively flat in order to juxtapose the cylinders relatively closely, the carburetors 36 can be connected to the cylinders via the intake manifold 35 having a simple shape, without taking special measures such as folding the intake manifold 35 sideways.

Since the throttle shafts 80 of the respective carburetors are independent and are juxtaposed, it is possible to provide a space for mounting the accessories such as the throttle sensor 92, accelerating pump 90 and so on which are operated in response to the rotation of the throttle shafts 80. The throttle sensor 92 detects the throttle opening amount on the basis of a rotating angle of the throttle shafts 80, and the accelerating pump 90 increases the amount of fuel to be supplied to the carburetors. Furthermore, the carburetors 36 are attached to the engine 9, and are housed in the relatively narrow space 6. Not only the links 86 but also the accessories such as the accelerating pump 90 and throttle sensor 92 are disposed on the side of the carburetor unit, which facilitates the maintenance work thereof.

As shown in FIGS. 6 and 7, the engine 9 is a two-cycle engine, in which the lubricating oil is not only supplied to the bearings of the throttle shafts 80 but is also mixed into the air-fuel mixture. For this purpose, each carburetor 36 is formed, on its flange 94 coupled to the intake manifold 35, with a pair of oil holes 95 which communicate with the bearings of each throttle shaft 80. Furthermore, a dovetail groove 96 is formed on each flange 94 between the oil holes 95. A flange of the intake manifold 35 is coupled to the flange 94 of the carburetor, and is provided with a lubricating oil plug 97. When the carburetors 36 are coupled in a liquid-tight state using these flanges and are attached to the intake manifold 35, oil passages are formed from the lubricating oil plug 97 to the bearings of the throttle shafts 80 via the dovetail grooves 96 and oil holes 95.

The oil pump 70 supplies the lubricating oil, under pressure, to the lubricating oil plug via a pipe (not shown). The lubricating oil is forcibly supplied to the bearings of the throttle shafts 80 via the foregoing oil paths. Parts outside the oil holes 95 for the bearings are provided with oil sealing members, so that the lubricating oil does not leak out of the bearings but drips into the barrel 82.

In a boat in which bilge water tends to enter into the engine room, the ends of the throttle shafts should be exposed to the exterior in order to attach the accessories. However, oil films formed by the foregoing lubricating structure are effective in preventing bilge water from entering into the engine of the boat via the bearings for the throttle shafts.

The jet boat is driven by the rider sitting astride the seat 3 with his or her feet maintained on the footrests 7 and operating the steering handle 2. The engine 9 is made compact by reducing the spaces between the cylinders, so that the power unit can be housed in the limited space 6 in the jet boat 1. This enables the jet boat 1 to demonstrate desired mobility. In other words, the mobility of a small boat such as a jet boat extensively depends upon the location of the relatively heavy power unit, similarly to motorcycles. Therefore, the reduced size power unit can be disposed at desired positions, which is effective in promoting the mobility of the jet boat.

Under the normal operation of the jet boat except for the operation at a low speed or under a low load, the exhaust control valves 40 maintain the exhaust ports 39 fully open. The engine 9 repeatedly performs the two-stroke process and rotates the impeller 13 at a high speed, as follows. The air-fuel mixture is supplied to the crankcase 23 via the intake ports 33, is supplied to the combustion chambers from the scavenging ports 53 via the scavenging passages 54 in response to the downward movement of the pistons 30, is compressed by the upward movement of the pistons 30, is ignited by the spark plugs 75, and is burnt. Although the cylinders are juxtaposed close together, the scavenging passage 54 can have a sufficient cross sectional area, and can discharge exhaust gases efficiently.

In the present embodiment, the engine performs combustion in an active and hot atmosphere. Therefore, if the impeller 13 is rotated at a low speed or if it is stopped during idling (i.e., when the engine is operating at a low speed or under a low load), the exhaust control valves 40 substantially fully close the exhaust ports 39, and the engine keeps on performing the combustion in the active and hot atmosphere, thereby improving the fuel economy and promoting purification of exhaust gases at low speed or under low load.

The exhaust control valves 40 rotate on the pivot 48 which is orthogonal to the opening direction of the exhaust ports 39. This is effective in reliably controlling closing of the exhaust ports 39 since the movable members such as the exhaust control valves 40 and pivot 48 are maintained rigid.

The present invention is described with respect to a two-cycle engine applied to a small jet boat with a saddle seat. However, the invention is also applicable to two-cycle engines for motorcycles or the like.

According to the invention, the scavenging passages of the scavenging ports adjacent to the exhaust ports are made relatively flat and extend to the sides of the exhaust ports. This structure allows a two-cycle engine to be made which includes a narrow cylinder section and scavenging passages with a sufficient cross sectional area. Particularly, it is possible to reduce the size of the engine space for housing the engine, which enables a small jet boat or the like to have improved mobility.

In the two-cycle engine of the present invention, a plurality of cylinders are juxtaposed, and the exhaust ports are arranged in a direction substantially orthogonal to the juxtaposed direction of the cylinders. The exhaust control valves are positioned near the exhaust ports in order to vary the open areas of the exhaust ports, and are collectively supported by the pivot extending substantially in parallel with the cylinders. This structure allows the size of the two-cycle engine to be reduced, simplifying the exhaust control valves and the space for housing these valves, reducing manufacturing cost of the engine, facilitating assembly and maintenance of the components, and improving precision of exhaust emission control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A two-cycle engine comprising:
    at least one cylinder;
    an exhaust port formed on an inner wall of each of said at least one cylinder;
    an exhaust passage communicating with said exhaust port, said exhaust passage for communicating with an exhaust pipe;
    scavenging ports formed on said inner wall of each of said at least one cylinder; and
    scavenging passages communicating with said scavenging ports, said scavenging passages communicating with a crankcase, said scavenging passages formed adjacent to said exhaust port include an elongate cross-section extending generally along an entire length of said scavenging passages from the crankcase to the scavenging ports, respectively, and a portion of said elongate cross-section of said scavenging passages is located between adjacent cylinders.

2. The two-cycle engine according to claim 1, wherein there are a plurality of said at least one cylinder arranged in parallel with each other, said exhaust passages being arranged in a direction substantially orthogonal to the parallel direction of said cylinders, said engine further comprising exhaust control valves disposed near said exhaust ports of each of said cylinders for controlling open areas of said exhaust ports, said exhaust control valves being mounted for swinging about an axis parallel to the parallel direction of said cylinders.

3. The two-cycle engine according to claim 2, wherein at least four of said scavenging passages are provided for each of said cylinders, two on a side of said cylinders adjacent to said exhaust ports and two on a side remote from said exhaust ports.

4. The two-cycle engine according to claim 3, wherein said scavenging passages formed remote from said exhaust ports have a wide cross-sectional shape at one side and narrow cross-sectional shape at another side said narrow side extending into a space between adjacent cylinders and said wide side extending away from said space.

5. The two-cycle engine according to claim 3, wherein another portion of said elongate cross-section extends into a space between adjacent exhaust passages.

6. The two-cycle engine according to claim 3, wherein adjacent cylinders include four of said scavenging passages therebetween, two from each of said adjacent cylinders.

7. The two-cycle engine according to claim 6, wherein two of said four scavenging passages include another portion of said elongate cross-section extending into a space formed between adjacent exhaust passages of said adjacent cylinders.

8. The two-cycle engine according to claim 6, wherein two of said four scavenging passages includes another portion of said elongate cross-section extending away from said adjacent cylinders.

9. The two-cycle engine according to claim 3, wherein five of said scavenging passages are provided for each of said cylinders.

10. A two-cycle engine comprising:
a plurality of cylinders;
an exhaust port formed in an inner wall of each of said plurality of cylinders on a first side thereof;
an exhaust passage in communication with each said exhaust port, said exhaust passage extending away from said exhaust port;
a plurality of scavenging ports formed in an inner wall of each of said plurality of cylinders on said first side thereof; and
a plurality of scavenging passages in communication with said plurality of scavenging ports, at least one of said plurality of scavenging passages for each of said plurality of cylinders being formed between adjacent of said plurality of cylinders, said at least one of said plurality of scavenging passages for each of said plurality of cylinders having an elongate cross-section extending generally along an entire length of said scavenging passages from the crankcase to the scavenging ports, respectively, and a portion of said elongate cross-section of said at least one of said plurality of scavenging passages is located between adjacent cylinders.

11. The two-cycle engine according to claim 10, wherein said plurality of cylinders are arranged in parallel with each other, said exhaust passages being arranged in a direction substantially orthogonal to the parallel direction of said plurality of cylinders, said engine further comprising exhaust control valves disposed near said exhaust ports of each of said plurality of cylinders for controlling open areas of said exhaust ports, said exhaust control valves being mounted for swinging about an axis parallel to the parallel direction of said plurality of cylinders.

12. The two-cycle engine according to claim 11, wherein there are a plurality of scavenging ports formed on the inner wall of each of said plurality of cylinders on a second side thereof remote from said exhaust port.

13. The two-cycle engine according to claim 12, wherein said scavenging passages formed remote from said exhaust port have a wide cross-sectional shape at one side and narrow cross-sectional shape at another side said narrow side extending into a space between adjacent cylinders and said wide side extending away from said space.

14. The two-cycle engine according to claim 12, wherein adjacent cylinders include four of said scavenging passages therebetween, two from each of said adjacent cylinders.

15. The two-cycle engine according to claim 12, wherein there are five of said scavenging passages for each of said plurality of cylinders.

16. A two-cycle engine comprising:
a plurality of cylinders;
an exhaust port formed in an inner wall of each of said plurality of cylinders on a first side thereof;
an exhaust passage in communication with each said exhaust port, said exhaust passage extending away from said exhaust port;
a plurality of scavenging ports formed in an inner wall of each of said plurality of cylinders; and
a plurality of scavenging passages in communication with said plurality of scavenging ports, respectively, two of said plurality of scavenging passages for each of said plurality of cylinders being formed between adjacent of said plurality of cylinders, one of said two scavenging passages for each of said plurality of cylinders having a flat cross-section which has a first narrow end extending into a space between adjacent cylinders and a second wide end extending away from said space and into a space between adjacent exhaust passages.

17. The two-cycle engine according to claim 16, wherein said plurality of cylinders are arranged in parallel with each other, said exhaust passages being arranged in a direction substantially orthogonal to the parallel direction of said plurality of cylinders, said engine further comprising exhaust control valves disposed near said exhaust ports of each of said plurality of cylinders for controlling open areas of said exhaust ports, said exhaust control valves being mounted for swinging about an axis parallel to the parallel direction of said plurality of cylinders.

18. The two-cycle engine according to claim 17, wherein a second of said two scavenging passages for each of said plurality of cylinders has a flat cross-section which has a first narrow end extending into a space between adjacent cylinders and a second wide end extending away from said space and away from said first side of said plurality of cylinders.

19. The two-cycle engine according to claim 16, wherein adjacent cylinders include four of said scavenging passages therebetween, two from each of said adjacent cylinders.

20. The two-cycle engine according to claim 16, wherein there are five of said plurality of scavenging passages for each of said plurality of cylinders.

* * * * *